United States Patent
Burks

(10) Patent No.: US 7,316,604 B1
(45) Date of Patent: Jan. 8, 2008

(54) AIRCRAFT TRANSPARENCY POLISHER AND/OR SURFACE REFINISHER

(75) Inventor: Gary Douglas Burks, Louisville, KY (US)

(73) Assignee: Global Aero Services, Inc., Louisville, KY (US)

( * ) Notice: Subject to any disclaimer, the term of this patent is extended or adjusted under 35 U.S.C. 154(b) by 0 days.

(21) Appl. No.: 11/305,880

(22) Filed: Dec. 16, 2005

(51) Int. Cl.
*B24B 23/00* (2006.01)

(52) U.S. Cl. ............ 451/354; 451/438; 451/439; 451/451

(58) Field of Classification Search ............ 451/5, 451/28, 41, 354, 359, 434, 438, 439, 388, 451/494, 456
See application file for complete search history.

(56) References Cited

U.S. PATENT DOCUMENTS

| 3,701,223 A | * | 10/1972 | Cole et al. ............ 451/439 |
| 4,969,914 A |   | 11/1990 | Ikegaya |
| 5,525,027 A | * | 6/1996  | Jinno et al. ............ 414/680 |
| 5,964,645 A |   | 10/1999 | Jemt |
| 6,645,048 B1|   | 11/2003 | Linderholm |

* cited by examiner

*Primary Examiner*—Dung Van Nguyen
(74) *Attorney, Agent, or Firm*—Scott R. Cox

(57) ABSTRACT

A machine for polishing aircraft windows including a window positioner device securable to the side of an aircraft, a frame for holding a polishing system attachable to the window positioner device, a robot seat frame system attachable to the frame, and a robot secured to the robot seat including a robot arm with capability to pick up, use and discard abrasive pads useful for polishing aircraft windows.

15 Claims, 13 Drawing Sheets

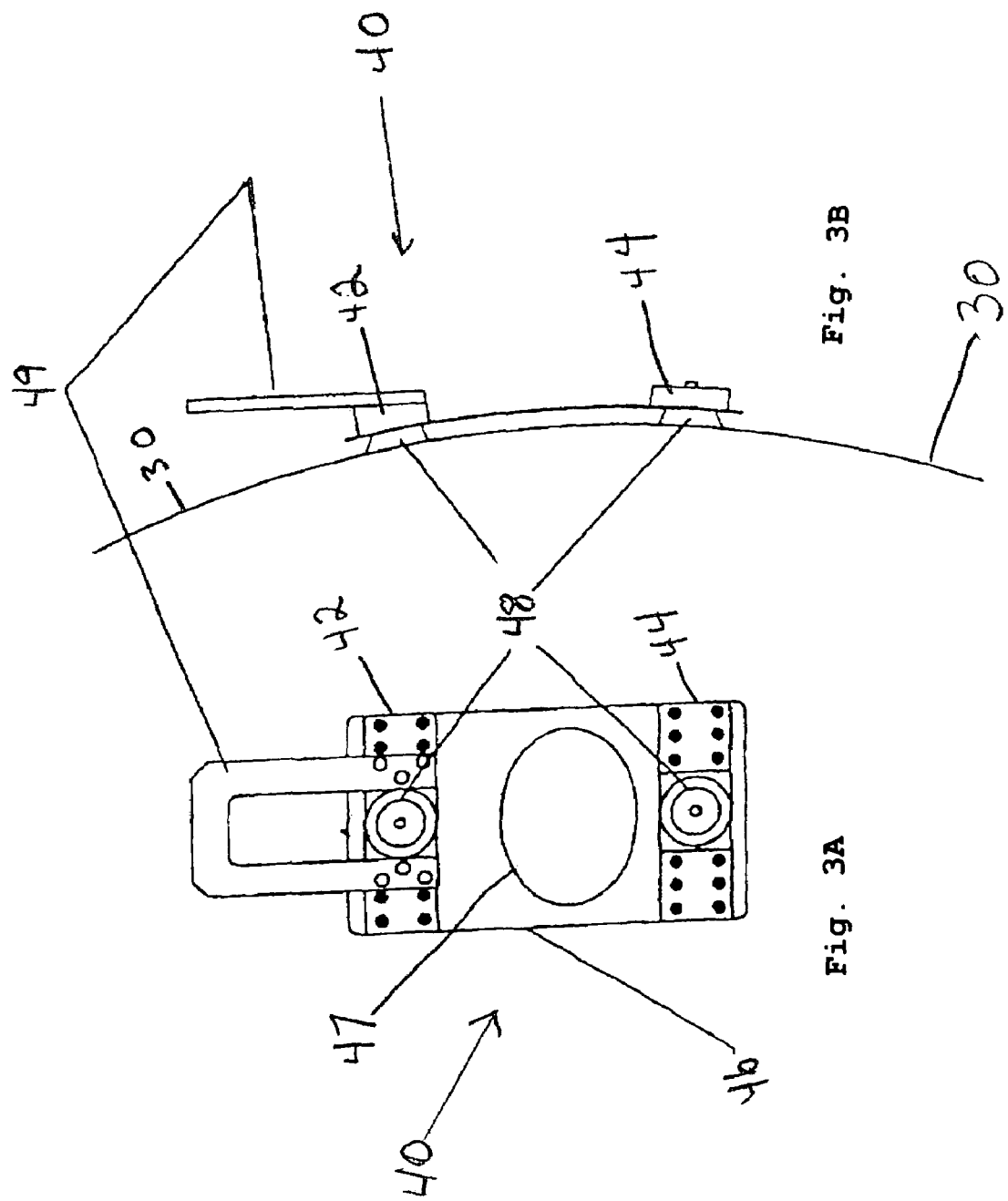

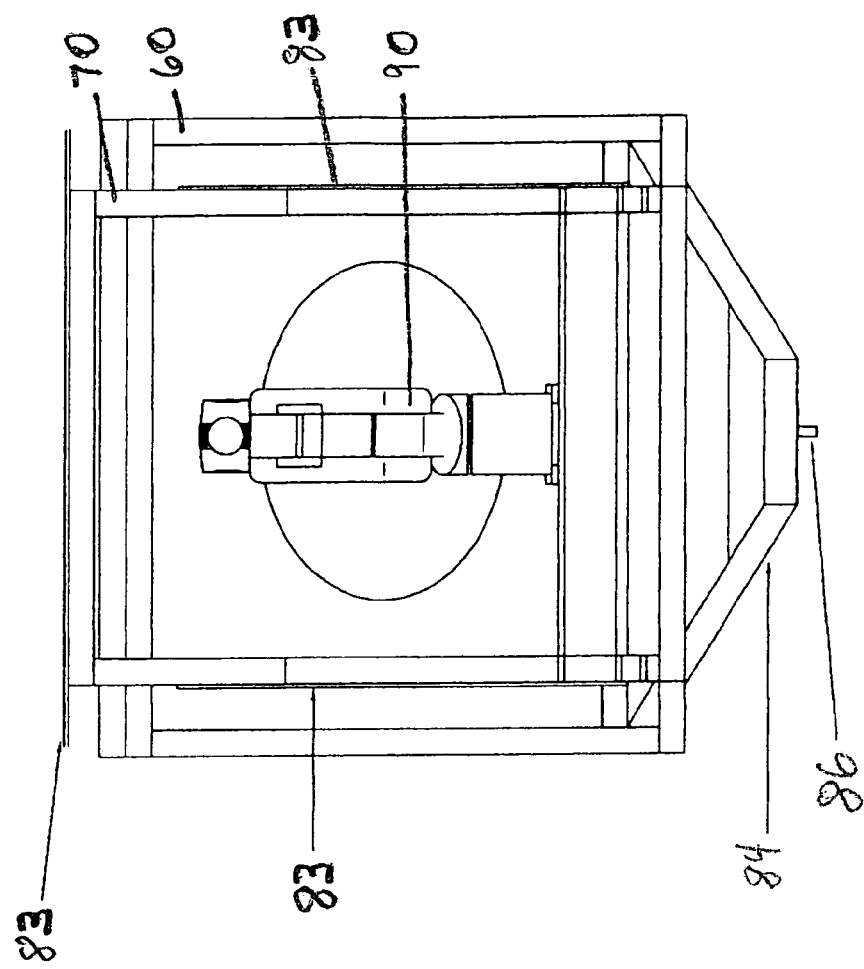
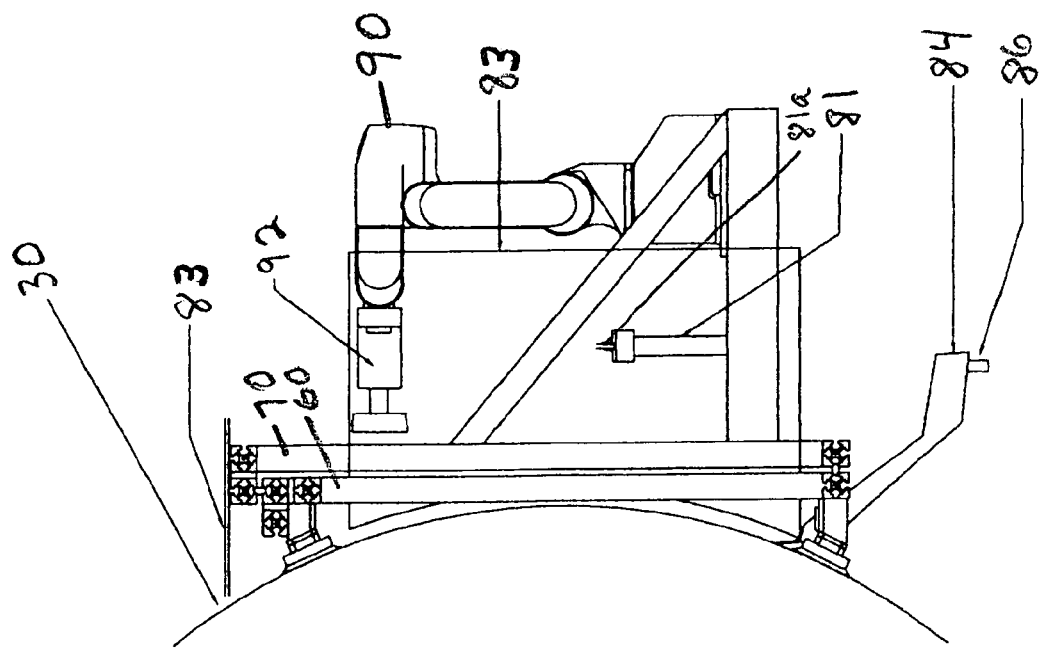

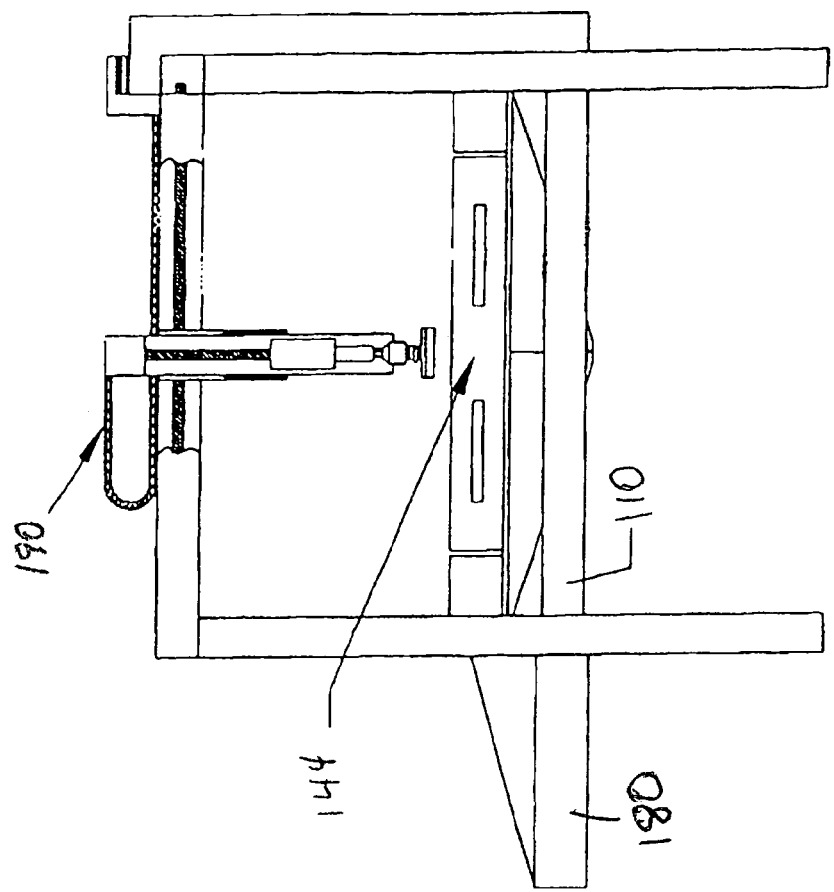
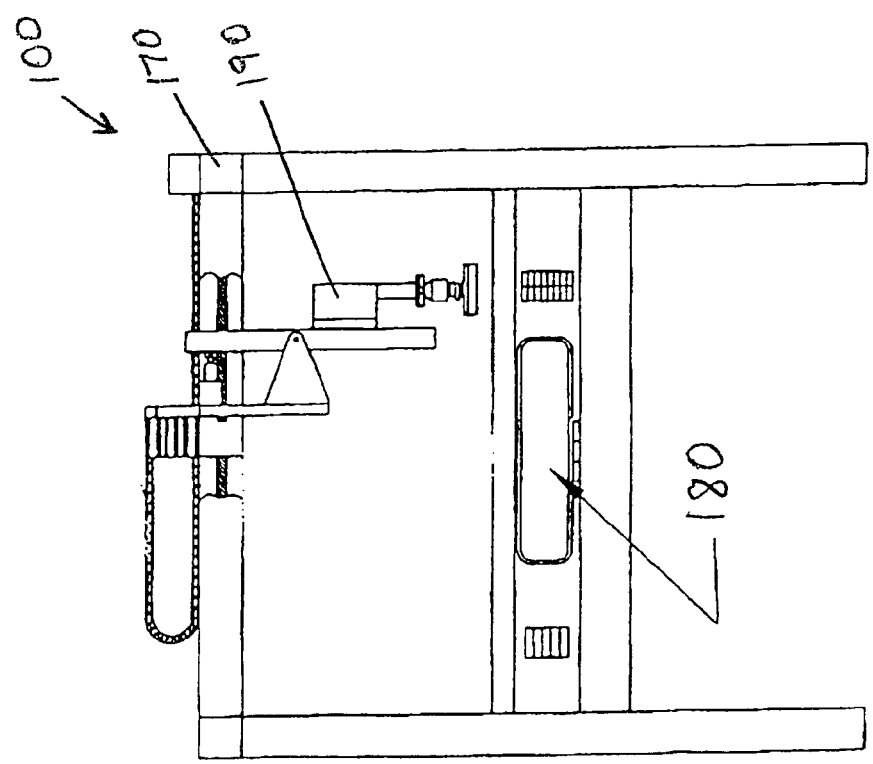
Fig. 10C
Fig. 10B

US 7,316,604 B1

AIRCRAFT TRANSPARENCY POLISHER AND/OR SURFACE REFINISHER

BACKGROUND

This invention relates to transparency refinishers, in particular a device which automatically polishes and/or resurfaces aircraft transparencies and/or windows either while those transparencies are installed in the aircraft or after the transparencies have been removed from the aircraft. Aircraft transparencies become scratched and pitted over a period of time as they undergo normal utilization. When aircraft fly at high speeds, small particles or dust that are present in the air impact the transparencies resulting in scratching and pitting. Additionally, transparencies suffer from crazing and the breakdown of protective coatings on the transparencies making them appear opaque. Conventional procedures are to remove these scratched, pitted and/or opaque transparencies from the aircraft and replace them with new transparencies containing a new seal. This is a labor intensive, time-consuming and expensive process. Further, while the transparency is removed from the aircraft for replacement, the aircraft cannot be used.

Attempts have been made to automate the aircraft transparency polishing process, as disclosed for example in U.S. Pat. Nos. 4,969,914, 5,964,645 and 6,645,048.

One object of this invention is to produce an aircraft transparency/window polisher and resurfacer that fully automates the polishing and resurfacing of aircraft transparencies while in the aircraft or after they have been removed from the aircraft. This object and other objects are disclosed by the inventions disclosed herein.

SUMMARY OF THE INVENTION

The present invention includes a machine for polishing aircraft transparencies and windows, whether those windows are in place in the aircraft or after they have been removed from the aircraft. In one embodiment the device of the invention, when utilized to polish aircraft transparencies and/or windows in place in aircraft, includes a window positioner device, which may be secured to a side of an aircraft; a frame, which is attachable to the window positioner device and to the side of the aircraft; a robot seat frame system attachable to the frame; and a robot secured to the robot seat, preferably a six-axis robot, but it may have fewer axes, which includes a robot arm with a motor and capability to pick up, use and discard abrasive pads useful for polishing and/or resurfacing aircraft transparencies and/or windows.

In an alternative embodiment the robot seat frame system is directly attachable to the side of the aircraft, thereby eliminating the need for the frame.

In a further embodiment the invention is utilized to polish aircraft transparencies and/or windows after their removal from the aircraft and includes a bench or console; window positioner component(s) securable to, or an element of, the bench or console; a robot seat frame system securable to, or an integral part of the bench or console; and a robot, securable to the robot seat frame system, which includes a robot arm with motor and capability to pick up, use and discard abrasive pads useful for polishing aircraft transparencies and/or windows.

The many advantages of these embodiments and others are clear from the description and claims.

BRIEF DESCRIPTION OF THE DRAWINGS

FIG. 3A is a front view of a window positioner device of the machine shown in FIG. 1A.

FIG. 3B is a side view of the window positioner device of FIG. 3A secured to the side of an aircraft.

FIG. 6A is a side view of the machine of FIG. 1A with added splash guards and drain pan.

FIG. 6B is a front view of machine as shown in FIG. 6A.

FIG. 10B is a front view of the machine of FIG. 10A.

FIG. 10C is a side view of the machine as shown in FIG. 10A.

DESCRIPTION OF A PREFERRED EMBODIMENT

The invention is designed for polishing aircraft transparencies and/or windows either on an aircraft or after the aircraft transparencies and/or windows have been removed from the aircraft. For purposes of this description, the invention is designed to polish and/or resurface any window or transparency of any aircraft. For purposes of this description the term "window" is all encompassing for any type of window, transparency, canopy or similar product that is an element of an aircraft. For purposes of this description "polishing" of a window of an aircraft refers to any treatment of the window including polishing, abrading, removal of protective coating, resurfacing, etc.

Figure 1B:
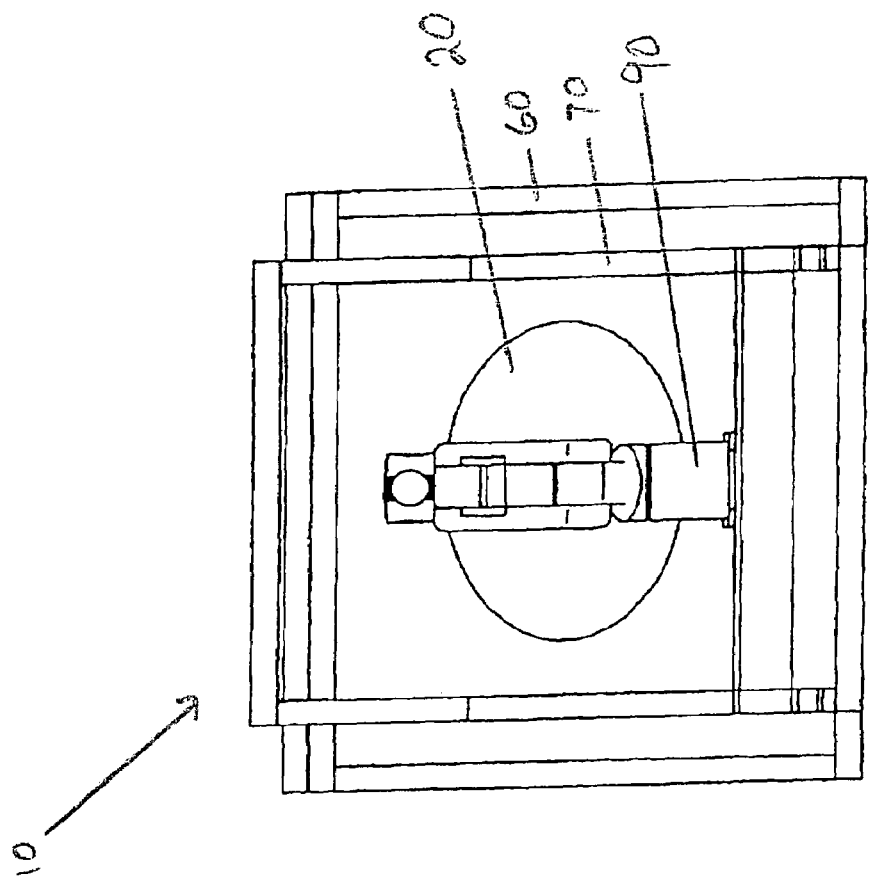
FIG. 1B is a front view of the machine, as shown in FIG. 1A.
Figure 1A:
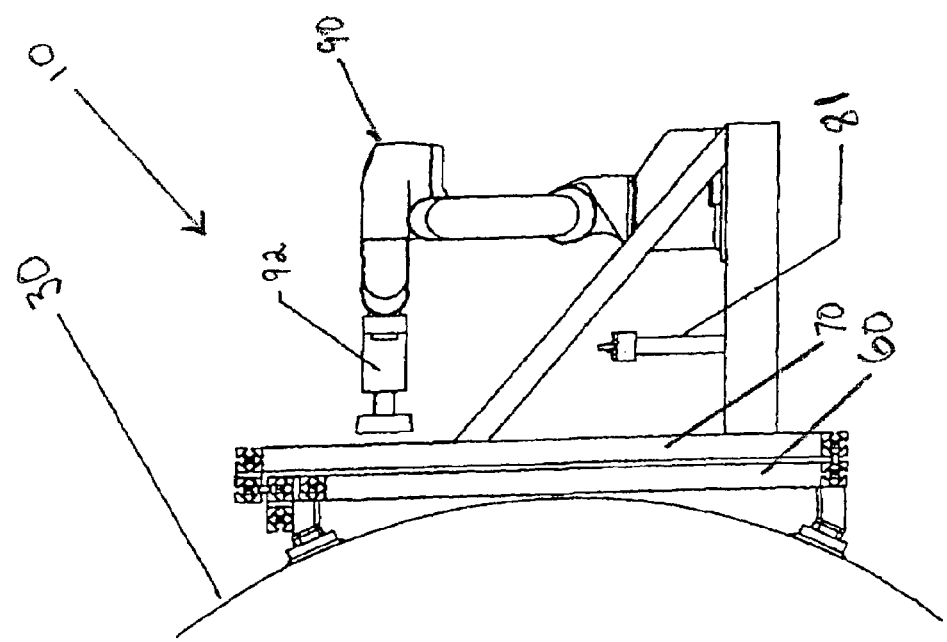
FIG. 1A is a side view of a first embodiment of the machine for polishing aircraft windows mounted on the side of an aircraft.

In one embodiment of the invention as shown in FIGS. 1A and 1B, the machine (10) is used for polishing aircraft windows (20) which are secured to an aircraft (30). The machine (10) includes a window positioner device (40) (see FIGS. 3A and 3B), securable to the aircraft, a frame (60), attachable to the window positioner device (40) and to the side of the aircraft, a robot seat frame system (70), attachable to the frame (60), and a robot (90) secured to the robot seat frame system (70), wherein the robot is preferably a six-axis robot and includes a robot arm (92) with a motor and capability to pick up, use and discard abrasive pads for the polishing and/or resurfacing of aircraft windows.

Figure 2:
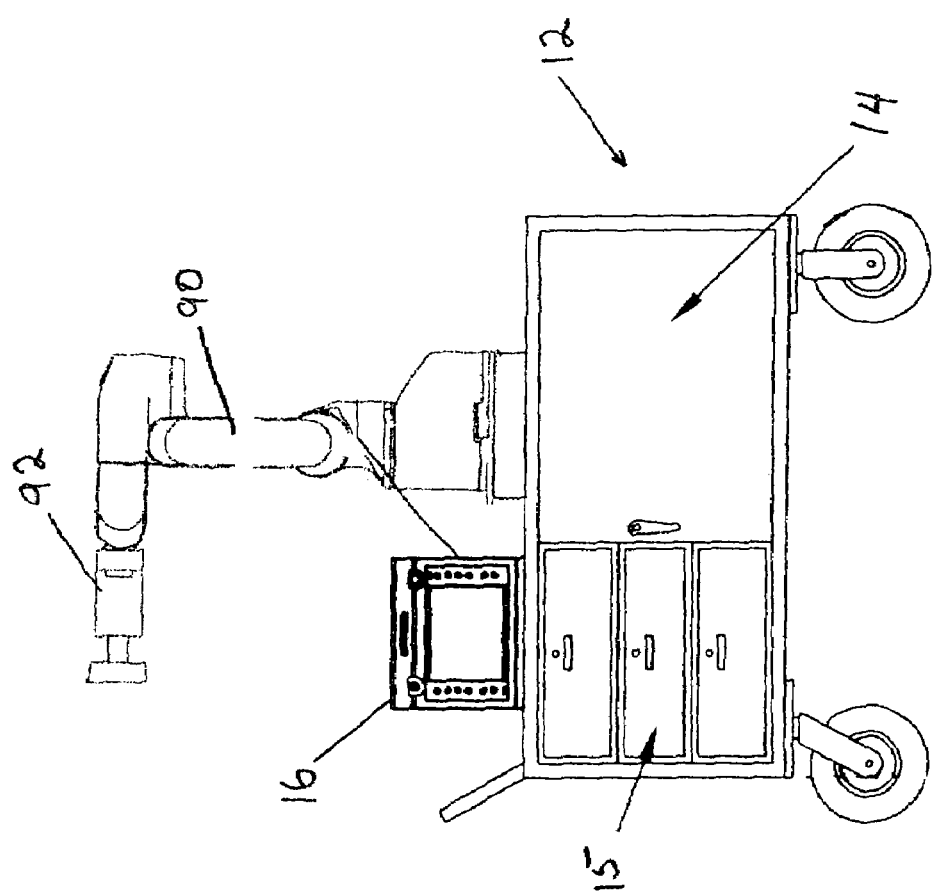
FIG. 2 is a side view of a cabinet on wheels used to support and transport components of the machine of FIG. 1A.

Utilized with the machine (10) is preferably a remote operating system (12), which is wheeled around on the tarmac and which provides electric lines, pressurized air lines and water lines (not shown) to the robot (90) to permit its operation for polishing aircraft windows. Any device which assists in the operation of the machine (10) is within the scope of the invention. In one embodiment, as shown in FIG. 2, the remote operating system (12) comprises a cabinet (14) on wheels, which is utilized to assist in operation of the machine (10). This cabinet (14) may include a number of drawers (15) along with electric lines, pressurized air lines, and water lines (not shown) utilized in the operation of the robot (90). Further, the cabinet (14) may support a control unit (16), which is also utilized in the operation of the robot (90). In addition, the cabinet (14) may support the robot (90) itself prior to placement on the robot seat frame system (70). The cabinet (14) is preferably on wheels to assist in its movement to the proper location for utilization with the robot (90).

The window positioner device (40) of this embodiment, as shown in FIGS. 3A and 3B, can be any device which is helpful in the proper alignment of the frame (60) onto the aircraft. For example, the window positioner device may be a laser device (not shown), a camera (not shown) or a mechanical device, such as is shown in FIGS. 3A and 3B, which assists in the correct placement and positioning of the robot (90) on the side of the aircraft (30). This device may be separate from the robot (90) or it may be attached to any component of the machine (10), including the robot (90). For example, the window positioner device can be a laser device or a camera that is attached to the robot (not shown). The window positioner device preferably includes components which permit it to be utilized with a number of different types and sizes of windows for different types and styles of aircraft.

In one embodiment the window positioner device (40), as shown in FIG. 3A, includes an upper and lower frame (42, 44) and a clear insert (46) secured between the two frames. The device is securable to the side of an aircraft by any conventional securing system, such as vacuum suction cups (48). The clear insert (46), that is secured between the two frames, is preferably a clear, plexiglass section in which the outline of the window (47) to be polished is etched or cut out in the specific shape of the window to be polished to assist in the proper alignment of the window positioner device (40) around the window (20). In utilization this window positioner device (40) is secured against the side of the aircraft (30), as shown in FIG. 3B. The etched or cut out window outline (47) is placed directly over the window (20) of the aircraft (30) that is to be polished. By placement of the window outline (47) in position directly over the window to be polished, all other components of the machine are properly aligned on the side of the aircraft.

In one embodiment, this window positioner device (40) also includes a frame alignment tab (49), which extends upward from the upper frame (42) of the window positioning device, as shown in FIG. 3A. This frame alignment tab (49) cooperatively interacts with the frame (60) for holding the polishing system, such that once the window positioner device (40) is secured in a proper position on the side of the aircraft, such that it is properly positioned over the window to be polished, the frame (60) for holding the polishing system is automatically located over that frame alignment tab (49) in a correct position for the attachment of the frame (60) to the side of the aircraft. Once the frame (60) for holding the polishing system is attached at the proper location on the side of the aircraft, the window positioner device (40) can be removed and is ready for use with the next window to be polished.

Figure 4B:
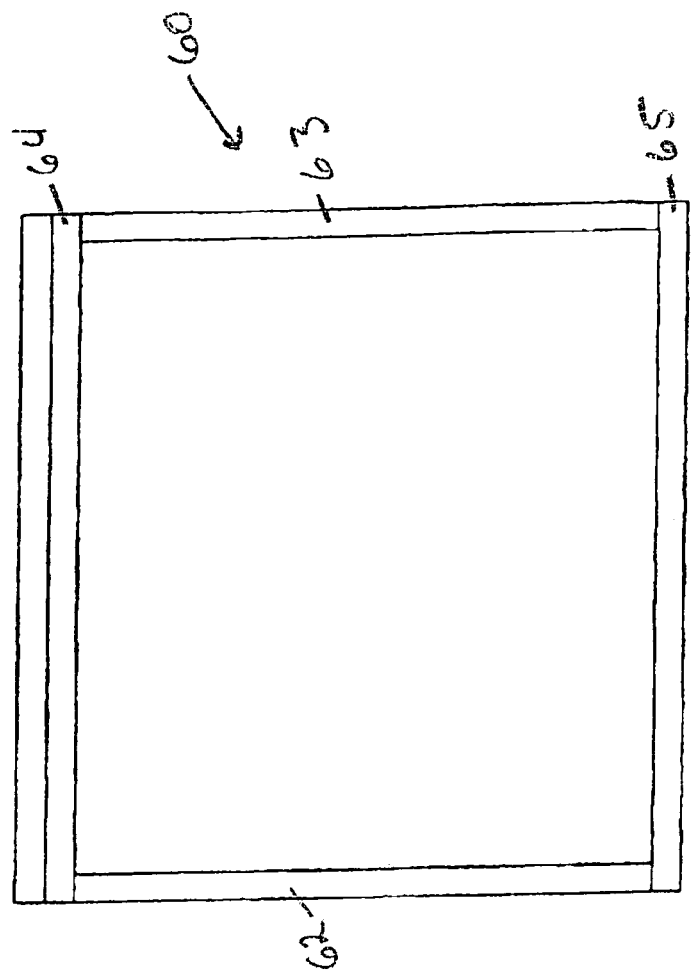
FIG. 4B is a front view of the frame for holding the polishing system of FIG. 4A.
Figure 4A:
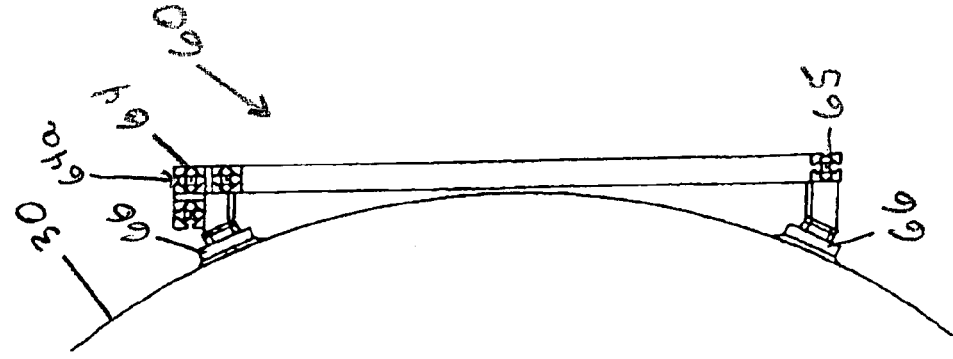
FIG. 4A is a side view of a frame for holding a polishing system of the machine shown in FIG. 1A, secured to the side of an aircraft.
Figure 7:
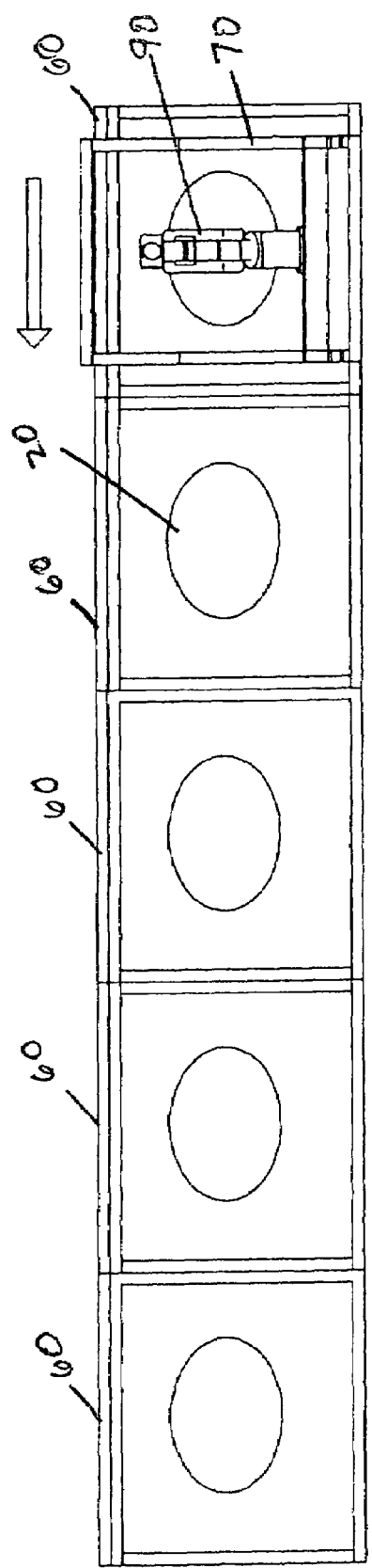
FIG. 7 is a front view of the side of an aircraft showing a series of frames secured to the side of an aircraft over its windows on which the robot seat frame system with robot of FIG. 1A can move.

The frame (60) for holding the polishing system includes components which support the robot seat frame system (70). In one embodiment, as shown in FIGS. 4A and 4B, this frame includes two parallel top to bottom frame members (62, 63) and two parallel left to right frame members (64, 65). These frame members may be manufactured from any sturdy but light material which is sufficiently strong to support the robot (90) and the other components of the machine (10). These frame members are connected together to form a rectangular shaped frame, as shown in FIG. 4B. The frame (60) for holding the polishing system is attachable to the side of the aircraft by any conventional attachment system. For example, a series of suction cups (66) may be secured to the back of the frame. These suction cups can be used to secure the frame (60) to the side of the aircraft. The frame (60) is properly positioned around the window to be polished by its interaction with the window positioner device (40). In one embodiment the upward extending, frame alignment tab (49) of the window positioner device (40) fits into a slot (not shown) that has been cut into, or formed as a component of, the top frame member (64) of the frame. When the tab (49) of the window positioner device is placed in this slot at the top frame member, the frame is automatically located in the proper position on the side of the aircraft in relation to the window to be polished. In one embodiment, as shown in FIG. 7, a series of frames (60) can be secured to the side of the aircraft over the windows to be polished.

Secured to this frame (60) is the robot seat frame system (70). This robot seat frame system (70), as shown in one embodiment in FIGS. 5A and 5B, holds the robot (90), the polishing pads placed in a polishing pad receptacle (71), a polishing pad removal device (81), a bin for used pads (82) and other components useful for the polishing of the aircraft windows.

Figures 5A, 5B:
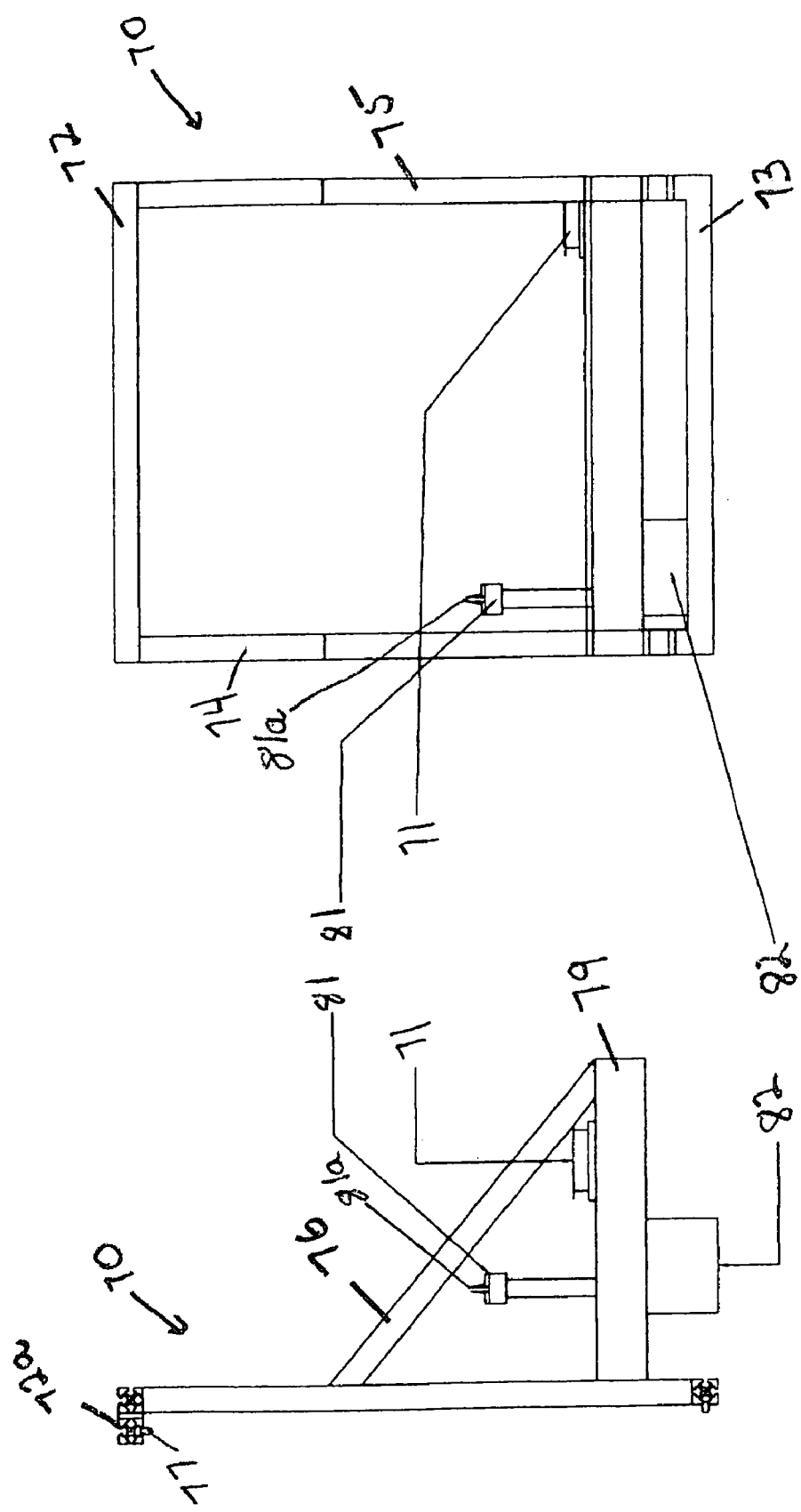
FIG. 5A is a side view of a robot seat frame system of the machine of FIG. 1A, which is attachable to the frame of FIG. 4A.
FIG. 5B is a front view of the robot seat frame system as shown in FIG. 5A.

In one embodiment the robot seat frame system (70) includes two parallel right to left frame system supports (72, 73) and two parallel top to bottom frame system supports (74, 75), as shown in FIG. 5B, which are connected together to form a rectangular frame system. Attached to the top to bottom frame system supports (74, 75) are a pair of extension frame members (76), extending outward from the rectangular frame system to support a support frame (79). Connected to the top to bottom frame system supports (74, 75) and the extension frame members (76) is the support frame (79) which supports a robot mounting platform (78), which can be any conventional size and shape that supports and holds the robot (90). Preferably, this mounting platform (78) is secured to the support frame (79) and holds the robot (90) securely in place. This component is discussed in more detail. Also secured to the robot seat frame system (70) may be other components, such as the polish pad removal device (81), which is also discussed in more detail.

The robot seat frame system (70) is secured to the frame (60) for holding the polishing system by any conventional means. In one embodiment a top, downwardly extending tab (77), which is secured to the lower edge of an extension (72a) of the upper, left to right frame system support (72), is placed within a slot (64a) cut into the top frame member (64). By placement of this slot (64a) at the top of the frame (60) at a particular location within the frame for holding the polishing system, and aligning it with the downwardly extending tab (77) of the robot seat frame system (70), the robot seat frame system (70) is placed in precise alignment directly at the proper position for polishing the aircraft window (20).

Figure 9B:
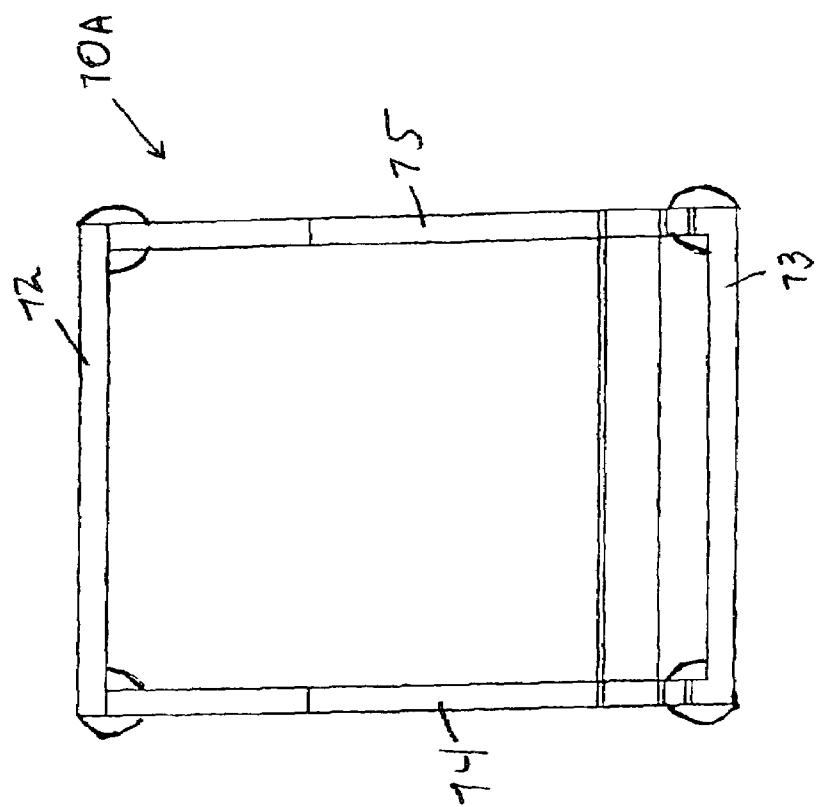
FIG. 9B is a front view of the second embodiment of the robot seat frame system of FIG. 9A.
Figure 9A:
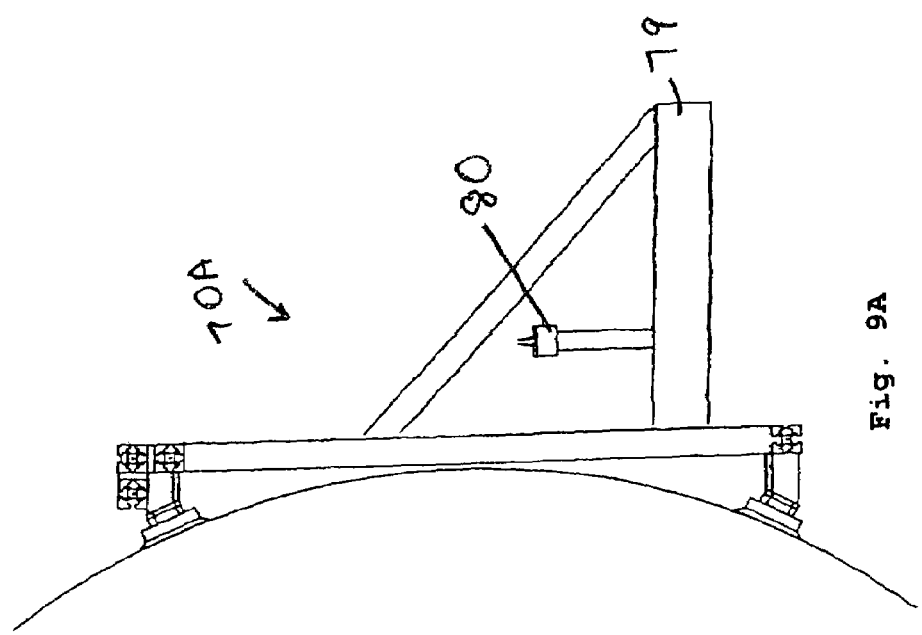
FIG. 9A is a side view of a second embodiment of the robot seat frame system of FIG. 5A, wherein this system is directly secured to the side of the aircraft.

In an alternative embodiment as shown in FIGS. 9A and 9B an alternative robot seat frame system (70A) is secured directly to the aircraft (30).

Secured to the robot mounting platform (78) is any robot (90) useful for polishing the windows of the aircraft. In one preferred embodiment as shown in FIGS. 1A and 1B the robot (90) is a six-axis robot, such as is manufactured by Mitsubishi and Stauby. Alternatively, the robot can have fewer axes as is well known in the art. This robot (90) is programmed and secured to the robot mounting platform (78).

Figure 5C:
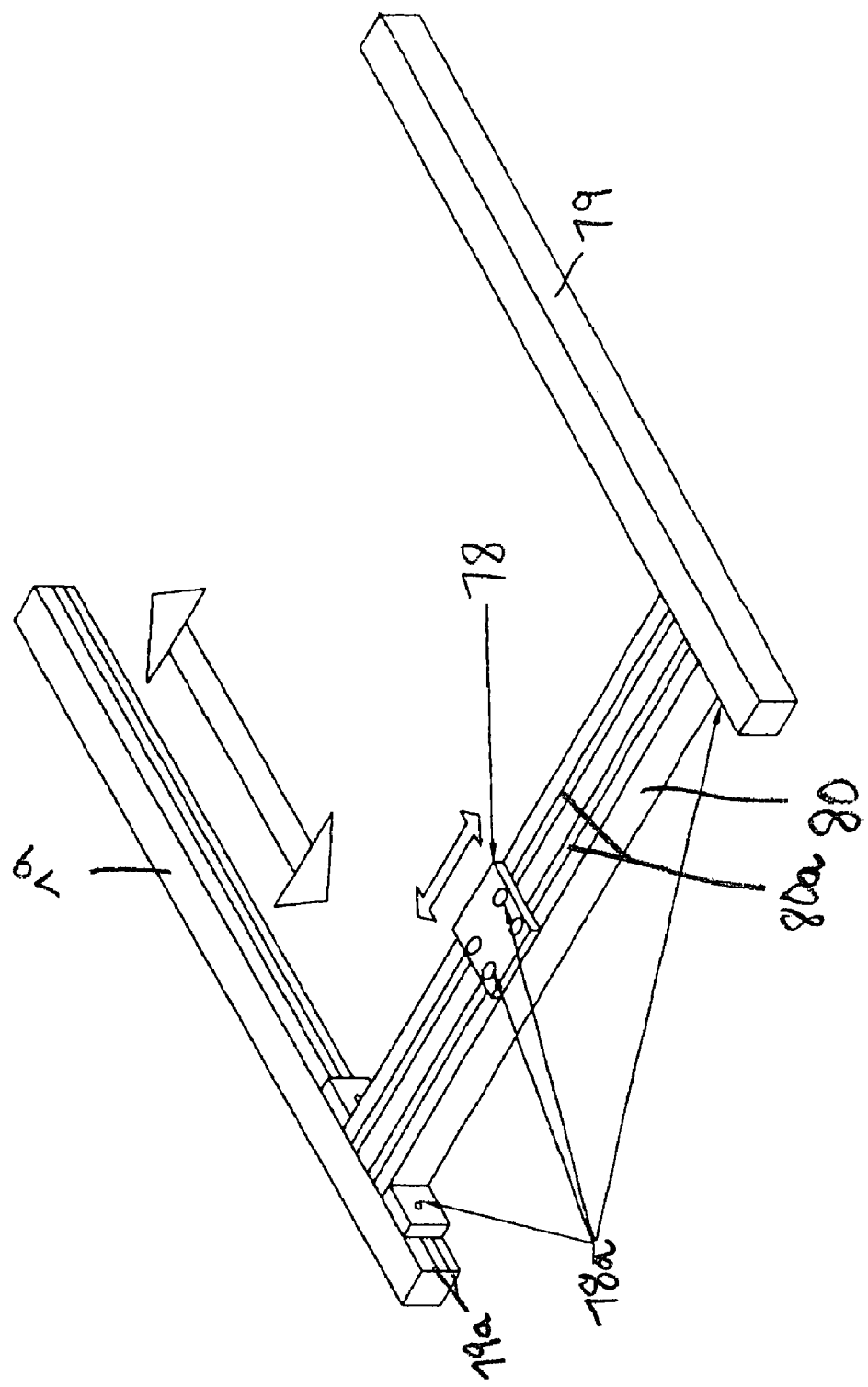
FIG. 5C is a perspective view of one embodiment of an extension frame member with robot mounting platform of the robot seat frame system of FIG. 5A.

It is important that the robot (90) be secured in the correct position directly in front of the window (20) and also be placed a proper distance away from the window. Any system which assures the proper placement of the robot in front of the window, a correct distance away from the window, is within the scope of the invention. In one embodiment the robot (90) is secured to the robot mounting platform (78), which is shown in FIG. 5C. The robot mounting platform (78) is preferably secured to the front support (80) of the support frame (79). In one embodiment the robot mounting platform (78) can be moved side-to-side within slots (80a) cut into the front support (80) of the support frame (79), as shown in FIG. 5C. This arrangement of slots (80a) permits a side-to-side movement of the robot (90) on the robot mounting platform (78) in front of the window. Once in proper position the robot mounting platform (78) can be secured in proper position by the use of locking bolts (78a). In addition, in another preferred embodiment, the front support (80) of the support frame (79) fits within slots (79a) cut into the inside portion of the support frame (79), as shown in FIG. 5C. The relative position of the robot mounting platform (78) in relation to the window (20) of the aircraft can be adjusted by movement of the front support (80) of the support frame (79) in and out, closer and further away from the aircraft window. Once the proper position for the robot (90) has been determined, the front support (80) of the support frame (79) can be secured in position in the slots (79a) in the support frame (79) by any conventional means, such as by the use of locking bolts (78a).

In a preferred embodiment a polishing pad receptacle (71) is also secured to the robot seat frame system (70), as shown in FIG. 5A. The robot (90) is programmed to remove abrasive pads from the polishing pad receptacle (71) and secure them to the end of its arm (92). As the six-axis robot applies the abrasive pads to the window (20) to be polished, lubrication is sprayed onto the window through a hose (not shown), preferably secured to the arm (92) of the robot (90). The hose is properly positioned so that the lubrication is sprayed only at the appropriate location on the window. Splash guards (83) are preferably provided on the side and top of the robot seat frame system (70) to prevent the lubricant from being sprayed onto the side of the plane itself, as shown in FIGS. 6A and 6B. Preferably, there is also secured to the frame (60), the robot seat frame (70), or the aircraft (30) itself a drain pan (84) with down spout (86), as shown in FIGS. 6A and 6B, which captures any liquid that falls from the window (20) being polished.

The polishing pads in the polishing pad receptacle (71) are preferably a series of pads with different degrees of abrasion capability. For example, in one preferred embodiment a series of pads (from 4 to 8 pads), each succeeding pad with a finer abrasion capability than the previous pad are placed within the receptacle. The robot (90) picks up the pads in sequence one after the other from the receptacle. The pads are secured to the end of the arm (92) of the robot (90) by any well known securing systems, such as hook and loop fasteners. Once the abrasives on the pad being used have been exhausted, the pad is removed from the end of the arm (92) of the robot and the robot is programmed to pick up the next abrasive pad. The abrasives that are on the pads may be any conventional abrasives and may include well known abrasives, including but not limited to, silica particles and industrial diamonds. In one embodiment, as shown on FIGS. 5A and 5B the receptacle (71) is a cup which is secured within a support on the robot seat frame system (70). In addition to the abrasive pads that are placed within the receptacle (71), the top of the receptacle may be sealed with a conventional plastic seal prior to utilization. In use this seal is removed and the receptacle (71) is placed in its receptacle holder on the robot seat frame system (70). The abrasive pad which is secured to the end of the arm (92) of the six-axis robot (90) abrades the surface of the window (20) as its moves along the surface of the window. The end of the arm (92) contains an orbital or rotary pneumatic or electric motor which rotates the abrasive pad and exerts sufficient pressure against the window for the abrasive pad to remove the damage from the surface of the window. The arm (92) of the robot (90) retains the abrasive pad in position while it is abrading the surface of the window. The movements of the robot arm (92) are controlled by its programming and the selection of routines by the operator of the machine. After a predetermined period of time, the arm of the six-axis robot (90) disposes of the pad and picks up a new pad. The systems for retaining the pad on the arm of the robot and for replacing it with a new abrasive pad are well-known in the art and are controlled by the programming of the computer and the selections of routines by the operator. In one embodiment the pads are removed by operation of the polish pad removal gripper device (81a), which device mechanically grabs the pad while on the robot arm and removes the used pad. These devices are sometimes referred to as a Zaytran robotic gripper magnum line.

Figure 8:
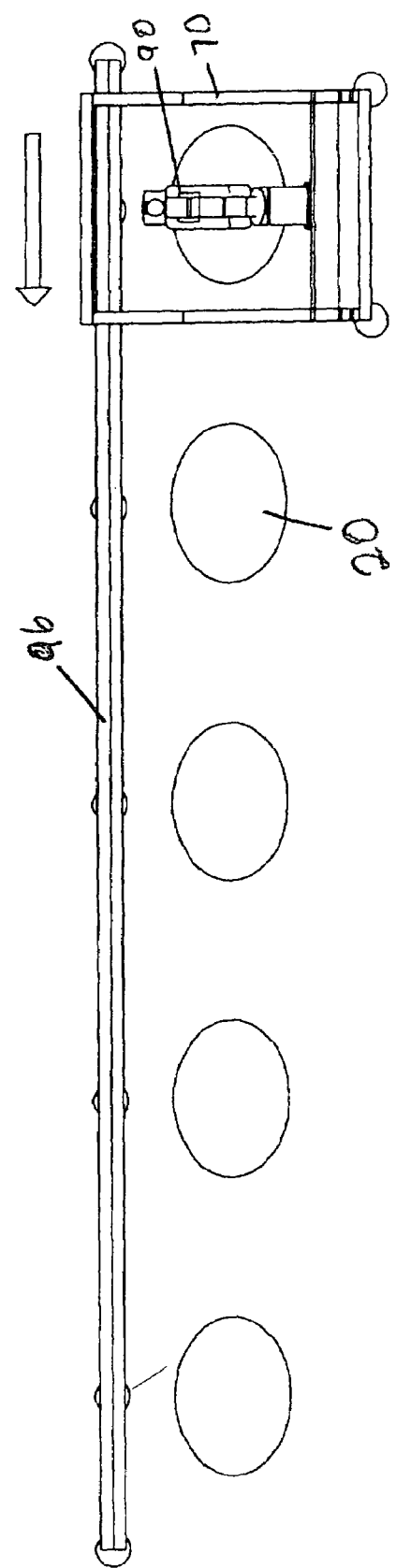
FIG. 8 is a front view of the side of an aircraft showing a rail system used to support the robot seat frame system of FIG. 1A as it moves from window to window on an aircraft.

Although the system described above describes the abrading of a single window, the robot (90) on the robot seat frame system (70) can be moved down the side of an aircraft by utilization of a series of frames (60), which are secured together end-to-end, as shown in FIG. 7. Alternatively, a rail system (96) can be secured to the side of the aircraft as shown in FIG. 8 to permit movement of the robot seat frame system (70) down the side of the aircraft. This rail system (96) can consist of a series of top supports on which the top of the robot seat frame system (70) is supported. With this embodiment it is not necessary to utilize the frame (60).

Once the windows on one side of the aircraft have been polished, the robot seat frame system (70) is removed from the frame (60) and then the frame is removed from the side of the aircraft. The machine (10) can then be installed on the opposite side of the aircraft (30) to polish the windows (20) located thereon.

Figure 10A:
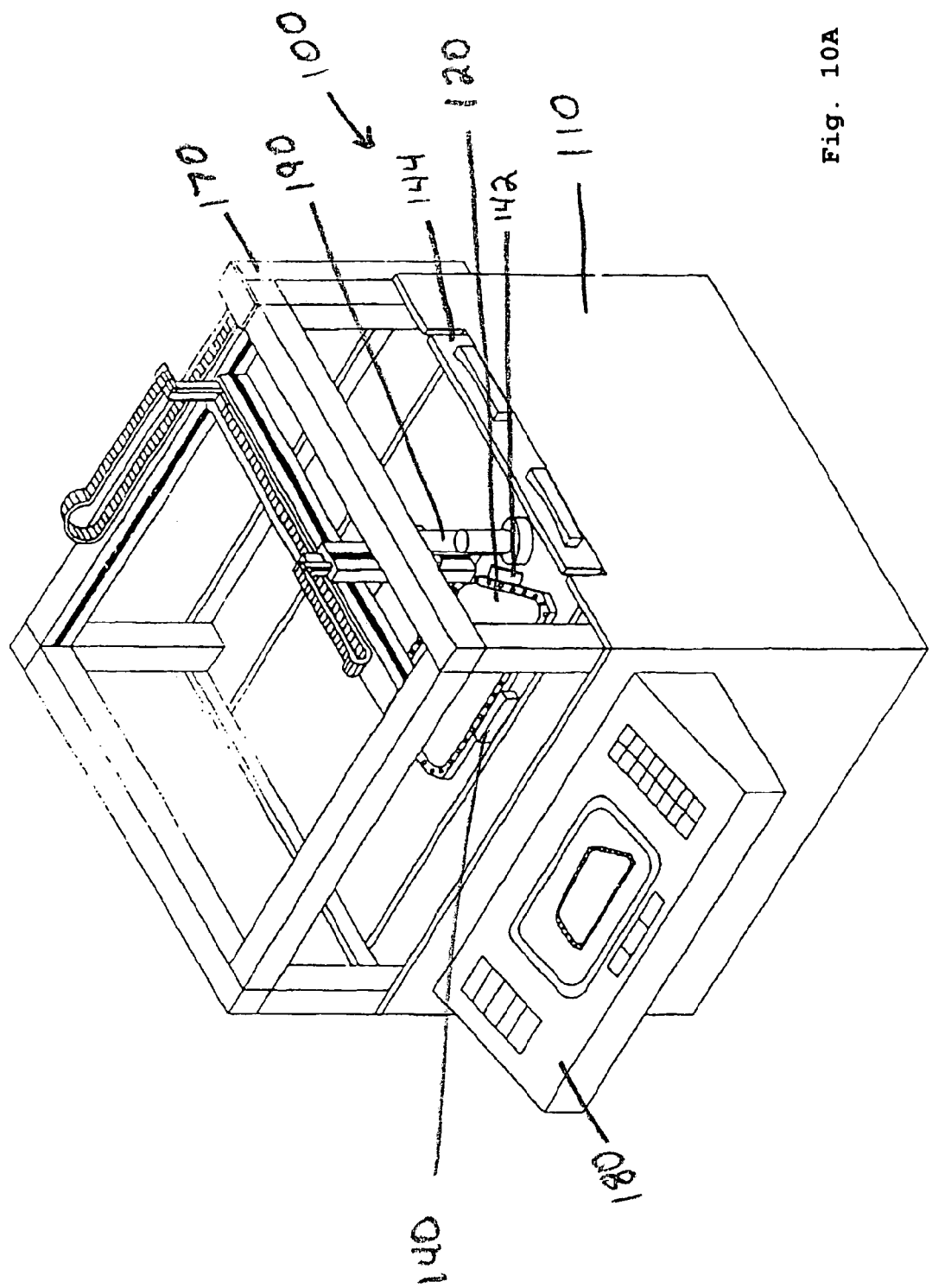
FIG. 10A is a front, perspective view of a third embodiment of the machine for polishing aircraft transparencies and/or windows which have been removed from an aircraft.
Figure 10D:
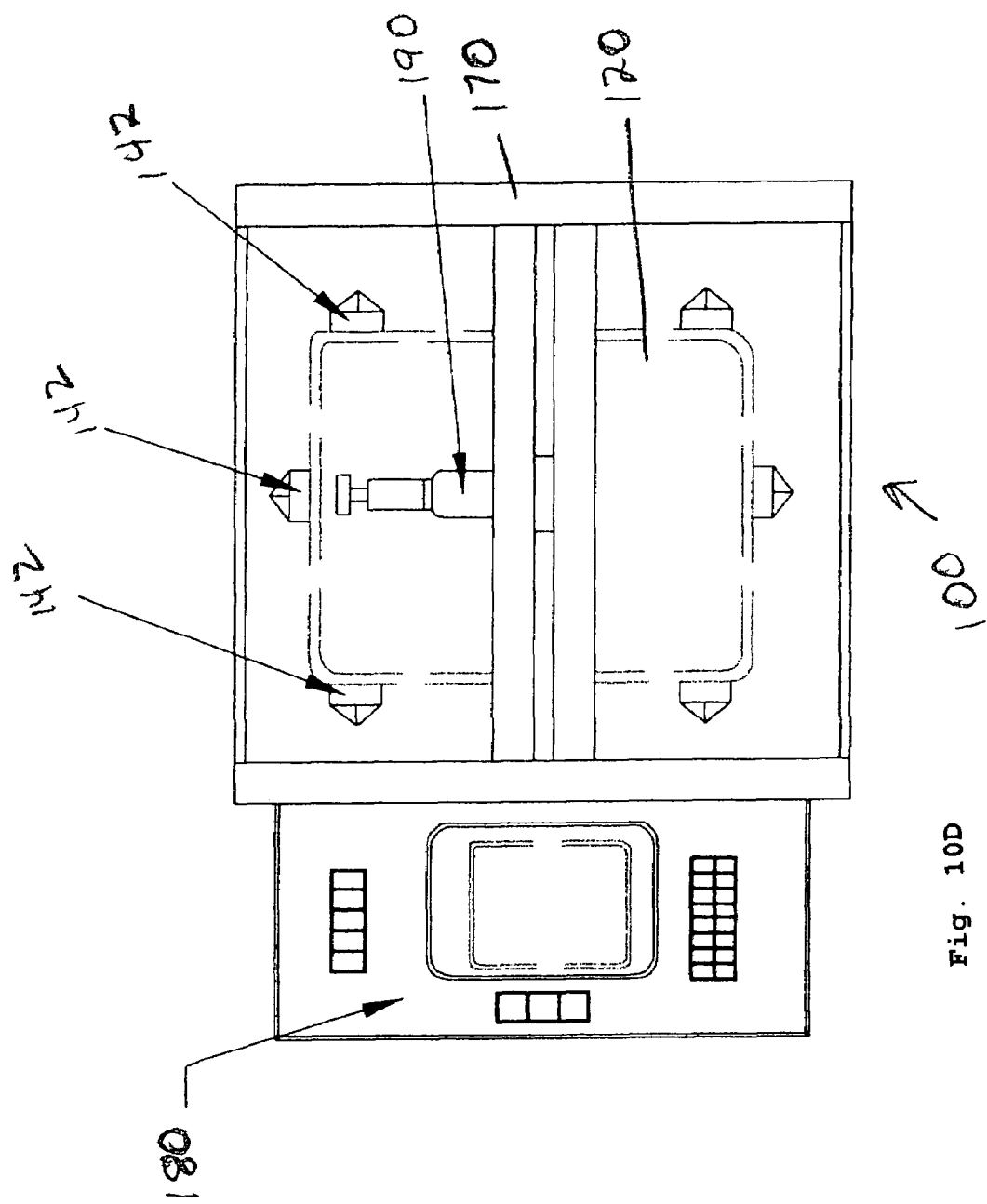
FIG. 10D is a top view of the machine as shown in FIG. 10A.

In an alternative embodiment, as shown in FIGS. 10A, 10B, 10C and 10D, a polishing system (100) can be utilized, wherein the aircraft windows (120) are removed from the aircraft and secured onto a bench or console (110). Proper location of the aircraft window on the bench or console is provided by a window positioner device (140), which is securable to or a component of the bench or console. For example in one embodiment, the window positioner device (140) is a series of fixed or adjustable clamping blocks (142) on a drawer or support (144), as shown in FIGS. 10A and 10C. The drawer or support (144) may slide away from the top of the bench or support to assist in loading of the windows onto the bench. The aircraft window (120) is placed in a proper location on the drawer or support (144) and is then secured in that location by means of the clamping blocks (142). The particular location on the drawer or support is predetermined and is important so that the robot (190) polishes the aircraft window in a predetermined manner. The drawer or support (144) is placed in a fixed location on the bench or console. Also secured to the bench or console is a robot seat frame system (170) to which is secured the robot (190) with an arm for polishing the aircraft windows. Once again a six-axis robot can be utilized to move its arm and polish the window. Robots with 2, 3, 4 or 5 axis may also be used. In a further alternative embodiment, the robot (190) may be a Cartesian robot which moves in an X, Y and Z plane to polish the window as shown in FIG. 10A. The movement of the robot is controlled by programming from a control panel (180), which may be secured to the bench or console (110). Once the individual window (120) has been polished, it can be removed from the bench or console (110) and the next window can then be secured in position.

The devices discussed herein disclose some of the inventions. Changes may be made to the devices without departing from the scope of the invention. The devices disclosed are only illustrative of some of the inventions disclosed herein.

The invention claimed is:

1. A machine for polishing aircraft windows of an aircraft comprising
    a window positioner device securable to a side of the aircraft surrounding the aircraft window;
    a frame, attachable to the window positioner device, wherein the window positioner device is removed from the side of the aircraft once the frame is attached to the side of the aircraft in a predetermined location surrounding the aircraft window;
    a robot seat frame system, attachable to the frame, and
    a robot secured to the robot seat frame system, wherein the robot includes a robot arm with motor and capability to pick up, use and discard abrasive pads useful for polishing aircraft windows.

2. The machine of claim 1 wherein the window positioner device comprises an upper and lower frame, a clear insert secured between the frames, and a window outline contained in the insert.

3. The machine of claim 1 wherein the frame comprises frame members and an attachment system for attachment of the frame to the side of an aircraft.

4. The machine of claim 1 wherein the robot seat frame system comprises frame system supports and a support for holding the robot.

5. The machine of claim 1 further comprising a splash guard to limit splashing of lubricant onto the side of the aircraft.

6. The machine for polishing aircraft windows of claim 1 further comprising a drain pan.

7. The machine for polishing aircraft windows of claim 1 further comprising a series of frames secured to the side of an aircraft, whereby the robot seat frame system moves from one frame to the next frame to polish successive windows on the side of the aircraft.

8. The machine for polishing aircraft windows of claim 1 wherein the window positioner device further comprises a system for positioning the device on the side of an aircraft system.

9. The machine for polishing aircraft windows of claim 1 further comprising a remote operating system attachable to the robot.

10. The machine for polishing aircraft windows of claim 1 wherein the robot comprises a six-axis robot.

11. The machine of claim 1 wherein the robot seat frame system further comprises a polish pad removal device.

12. The machine of claim 1 wherein the robot seat frame system further comprises a receptacle for holding polishing pads.

13. The machine of claim 12 wherein the polishing pads within the receptacle have various levels of abrasion capability.

14. A machine for polishing aircraft windows comprising
    a window positioner device;
    a frame, attachable to the window positioner device;
    a robot seat frame system, attachable to the frame, and
    a robot secured to the robot seat frame system, wherein the robot includes a robot arm with motor and capability to pick up, use and discard abrasive pads useful for polishing aircraft windows,
    and wherein the machine further comprises a splash guard to limit splashing of lubricant onto the side of the aircraft.

15. A machine for polishing aircraft windows comprising
    a window positioner device;
    a frame, attachable to the window positioner device;
    a robot seat frame system, attachable to the frame, and
    a robot secured to the robot seat frame system, wherein the robot includes a robot arm with motor and capability to pick up, use and discard abrasive pads useful for polishing aircraft windows,
    and wherein the machine further comprises a drain pan.

* * * * *